Sept. 11, 1962  D. C. WALKER ETAL  3,053,074
SEMI-MICRO MELTING POINT SYSTEM
Filed Aug. 6, 1958  2 Sheets-Sheet 1

INVENTORS:
Donald C. Walker
Marvin D. Gambril
BY
Everett A. Johnson
ATTORNEY

Sept. 11, 1962     D. C. WALKER ETAL     3,053,074
SEMI-MICRO MELTING POINT SYSTEM
Filed Aug. 6, 1958     2 Sheets-Sheet 2

INVENTORS:
Donald C. Walker
Marvin D. Gambril
BY
Everett A. Johnson
ATTORNEY

United States Patent Office 3,053,074
Patented Sept. 11, 1962

3,053,074
SEMI-MICRO MELTING POINT SYSTEM
Donald C. Walker, Lansing, Ill., and Marvin D. Gambril, Highland, Ind., assignors to Standard Oil Company, Chicago, Ill., a corporation of Indiana
Filed Aug. 6, 1958, Ser. No. 753,449
1 Claim. (Cl. 73—17)

This invention relates to the determination of melting points of substances such as waxes. More particularly, the invention relates to an improved apparatus and technique for rapidly and conveniently determining and recording the melting point of micro samples of hydrocarbon waxes in routine process control analyses.

Melting point is one of the most commonly determined physical properties of petroleum wax. However, there is no system for quickly and accurately determining the melting point of a small amount of wax. Such a method is needed when time is important or when only a limited amount of wax is available for test.

Heretofore the melting point of waxes has been measured by the American Standards Method ASTM D87–57 entitled "Melting Point of Paraffin Wax." In this method a large sample of about 25 g. of wax is heated to at least 15 degrees above its melting point. A test tube is filled to a height of two inches with the melted sample and supported in an air bath. The air bath is supported within a water bath, the temperature of which is controlled while cooling the sample through its freezing point. The cooling curve of the wax is plotted and a plateau appears on the curve at the melting point. The method requires about an hour for each determination and the manual reading and plotting of a series of temperatures requires technical skill and attention, making the test unsuitable for rapid routine determinations.

Other methods for melting or freezing point determinations have been proposed. Capillary tube and block melting point methods are accurate for pure compounds but have poor reproducibility for waxes. Drop-point or thermometer-bulb freezing point methods are easy to run but the accuracy is effected by the viscosity of the melted wax. Results obtained from certain of these methods may differ by several degrees.

The ASTM D87–57 method gives reproducible results but, as noted above, requires relatively large samples, and at least an hour for a single determination. Further, certain motor-oil and microcrystalline waxes cannot be determined by the ASTM method because the cooling curve shows no plateau at the melting point.

It is, therefore, a primary object of our invention to provide an improved apparatus for determining melting point on a micro sample. It is a further object of this invention to provide a melting point determining system which has an accuracy comparable to the best of the standard methods. Another object of the invention is to provide an improved apparatus whereby the deficiencies of other systems are substantially eliminated. A more specific object of the invention is to provide an apparatus capable of giving rapid melting point information on very small samples. A further object of the invention is to provide a melting point apparatus which is adapted for use in routine analyses of a large number of samples. It is an additional object of the invention to provide such a system which requires a substantially shorter period of time for conducting the test than has heretofore been necessary. It is also an object of the invention to provide an apparatus which is rugged in construction and simple in operation so as to be adapted for use by other than highly trained technical personnel. An important object of the invention also is to provide an apparatus which automatically indicates the melting point with a reproducibility and accuracy which is as good as that of ASTM D87–57, i.e., not different by more than 0.2° F. These and other objects of the invention will become apparent as the description thereof proceeds.

Briefly, according to our invention we provide a system wherein the temperature of one drop of wax is measured with a small thermocouple, and the cooling curve is automatically recorded in about five minutes. In making the test one drop, 20–60 mg., of melted wax is applied to a thermocouple coil which is placed within a heating sleeve. The melted sample is held to the coil by surface tension and is removed after a test by dipping the coil in a solvent. The temperature of the heating sleeve is raised and the approximate melting point is observed when the wax is remelted. A cooling curve is automatically plotted and shows a sharp plateau at the freezing point.

Further details and advantages of our system will be described by reference to an embodiment of the invention illustrated in the accompanying drawings wherein.

Figure 1:
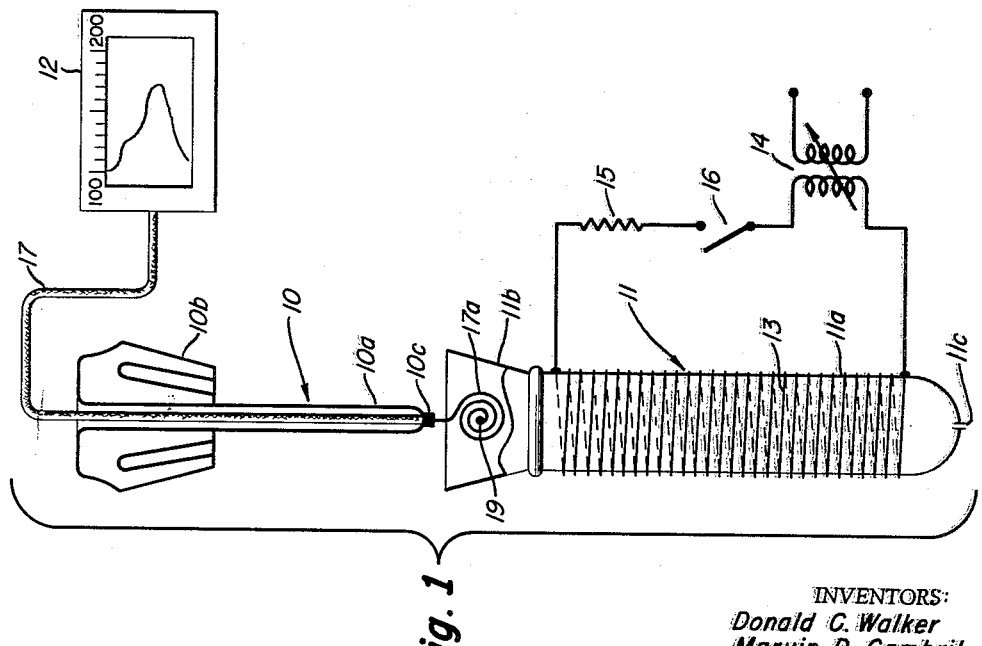
FIGURE 1 is an elevation schematically showing the general assembly of the apparatus.

Referring to the drawings, the apparatus comprises a thermocouple unit 10, a heating sleeve 11 and an automatic temperature recorder system 12.

The heating sleeve 11, which is used to melt the wax and to control the temperature during cooling, comprises a 12 mm. O.D. Pyrex tube 11a having a standard (14/35) taper throat 11b and a 1 mm. port 11c at the bottom. The over-all length of the heating sleeve 11 is about 11 cm. Over substantially its entire length the sleeve 11 is provided with an electrical resistance heater 13 which comprises about 28 turns of No. 28 Nichrome wire connected to a variable transformer 14. If desired, a secondary control resistance 15 may be in the heating circuit. Switch means 16 in the heater circuit may be controlled by the recorder system 12, as will be hereinafter described.

The thermocouple unit 10 comprises a Pyrex tube 10a which accommodates the thermocouple wire 17 and supports at its lower end the thermocouple coil. The tube 10a is in turn supported by the plug 10b which has a standard taper corresponding to the throat 11b. The thermocouple wire 17 is connected to the automatic temperature recorder system 12. This includes a strip chart continuous temperature recorder which has automatic balancing and a range of 100 to 200° F. The chart has 0.5° F. graduations and its speed is 24 in./hr.

Figure 2:
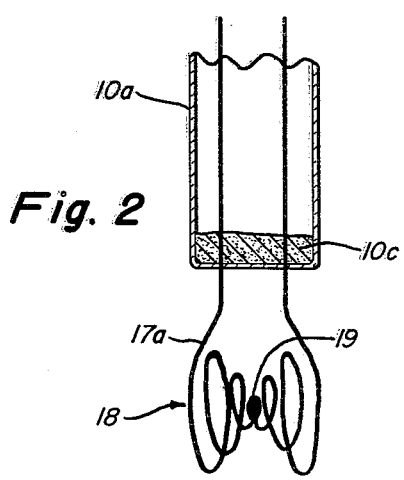
FIGURES 2 and 3 are enlarged front and side views, respectively, showing the details of the thermocouple coil.
Figure 3:
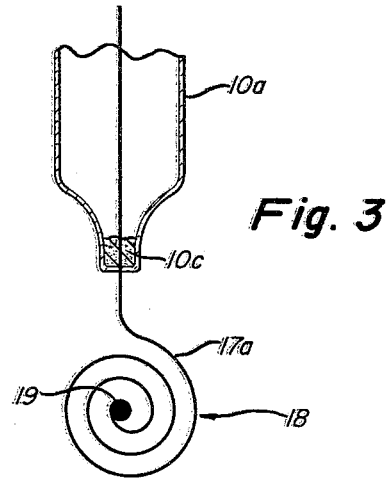
Figure 4:
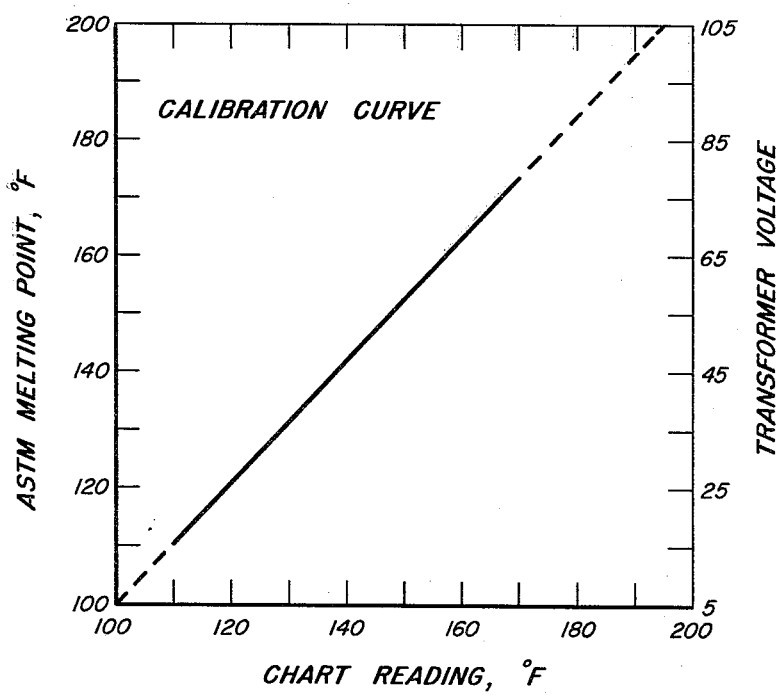
FIGURE 4 is a calibration curve used with our apparatus.

Details of the thermocouple coil 18 are shown in FIGURES 2 and 3. The wires 17a are coiled in a spiral so that the thermocouple 19 is in the center. The wires 17a do not touch but are close enough so that surface tension will hold the wax in the coil 18. The wires 17a are imbedded within glass seal 10c closing the lower end of the tube 10a, the tube 10a being 3 mm. O.D. and about 9 cm. long. The wires 17a merge with the thermocouple wire 17 which leads to the recorder 12 as described.

The thermocouple 19 is calibrated with several waxes having an ASTM D87–57 melting point range of 110 to 170° F.

The ASTM melting points are plotted against the chart readings of the temperature recorder 12, as shown in FIGURE 5. All points are within 0.1 ° F. of a straight line.

In operation the heating sleeve 11 is calibrated by plotting the chart temperature of the thermocouple 19 against the voltage of the variable transformer 14. In FIGURE 5 the voltages are plotted such that the temperature of the sleeve 11 will be 10 degrees below any chart reading.

The sample of the melted wax is applied to the side of the thermocouple coil 18 and the thermocouple unit 10 is placed within the heating sleeve 11. The transformer 14 is adjusted for a temperature of 180 to 200° F. and the approximate melting point of the sample is observed when the wax remelts. When the wax is 20 to 30 degrees above its estimated melting point the transformer 14 is readjusted for a sleeve temperature of about 10 degrees below the melting point. The resulting cooling curve plotted by the recorder 12 will show a sharp plateau at the freezing point. The temperature represented by the sharp plateau is applied to the calibrated curve of FIGURE 5 to obtain the corresponding ASTM melting point.

The apparatus and technique described has been used to determine the melting points of paraffin waxes, motor-oil waxes, blends of paraffin and motor-oil waxes and microcrystalline waxes. The results in Table 1 below show that this method is as accurate and reliable as the ASTM D87-57 method for determining melting point of waxes.

TABLE I

*Melting Points of Petroleum Waxes, ° F.*

| Wax | ASTM D87-57 | Apparatus |
|---|---|---|
| Paraffin Waxes: | | |
| A | 110.8, 110.8 | 110.7, 110.8 |
| B | 128.5, 128.5 | 128.6, 128.4 |
| C | 137.7, 137.7 | 137.8, 137.6 |
| D | 143.2, 143.2 | 143.4, 143.3 |
| E | 171.7, 171.6 | 171.8, 171.9 |
| Motor-Oil Waxes: | | |
| A | 146.4, 146.4 | 146.4, 146.4 |
| B | (¹), (¹) | 146.7, 146.4 |
| Paraffin Motor-Oil Wax Blends: | | |
| A | 137.8, 137.8 | 137.8, 138.0 |
| B | 140.2, 140.2 | 140.4, 140.4 |
| Microcrystalline Waxes: | | |
| A | (¹), (¹) | 169.0, 169.0 |

(1) No plateau in cooling curve.

The average deviation from the ASTM melting points is only 0.1 ° F. and the maximum deviation is 0.2 ° F. Because the wax cools relatively fast our apparatus determines the melting points of certain motor-oil and microcrystalline waxes that cannot be determined by the ASTM method. Furthermore, our system has the advantage of requiring only a micro sample of wax and only a few minutes for each determination. In addition, the cooling curve is automatically plotted.

From the above, it will be apparent that the principles employed in this instrument can be used to determine the melting point of a broad range of materials, that it permits the inspection to be made very rapidly because of the small sample needed, and that its precision is comparable to other standard methods.

Our invention has been described with reference to particular embodiments thereof, but it should be understood that these are by way of illustration only. The invention is not necessarily limited to these embodiments and alternative components and modified operating techniques will become apparent to those skilled in the art, in view of our foregoing disclosure. Accordingly, modifications in the construction of our apparatus and in the operation thereof are contemplated without departing from the spirit of our invention.

What we claim is:

Apparatus for determining the melting point of micro samples of waxes which comprises an electrically heated cylindrical sleeve, means for varying the electrical current to said heated sleeve, a tubular member removably insertable into said heated sleeve, a pair of thermocouple wires within said tubular member and projecting from one end thereof, a pair of symmetrical coils composed of said thermocouple wires extending from said one end and a thermocouple junction between said coils, said coils being adapted to hold a molten wax sample by surface tension to said thermocouple junction, means for measuring the temperature at said thermocouple junction as a function of time, and means for recording the time-temperature measurement to provide an indication of the melting point of said wax sample.

References Cited in the file of this patent

UNITED STATES PATENTS

| | | |
|---|---|---|
| 1,285,920 | Brown | Nov. 26, 1918 |
| 2,079,344 | Geyer | May 4, 1937 |
| 2,658,382 | Vanderkamp | Nov. 10, 1953 |
| 2,702,471 | Vonnegut | Feb. 22, 1955 |
| 2,825,222 | Stone | Mar. 4, 1958 |
| 2,885,885 | Lupfer et al. | May 12, 1959 |

FOREIGN PATENTS

| | | |
|---|---|---|
| 726,307 | Great Britain | Mar. 16, 1955 |
| 1,116,012 | France | Jan. 23, 1956 |
| 787,709 | Great Britain | Dec. 11, 1957 |